United States Patent Office 3,490,149
Patented Jan. 20, 1970

3,490,149
METHODS AND APPARATUS FOR DETERMINING DEPTH IN BOREHOLES
William E. Bowers, Houston, Tex., assignor to Schlumberger Technology Corporation, Houston, Tex., a corporation of Texas
Filed May 27, 1966, Ser. No. 553,451
Int. Cl. G01b 5/04; E21b 47/00
U.S. Cl. 33—133      27 Claims

ABSTRACT OF THE DISCLOSURE

In accordance with illustrative embodiments of the present invention, a technique is disclosed for determining the instantaneous changes in position of a tool supported by a cable in a borehole. The movement of the cable at the surface of the earth and the acceleration of the tool in the borehole and the cable at the surface of the earth are measured. The two acceleration measurements are combined to produce a signal for correcting the cable movement measurement. This corrected cable movement measurement will indicate the instantaneous changes in position of the tool in the borehole. Other embodiment show techniques for compensating the measurements for borehole inclination, temperature, and other factors.

---

This invention relates to methods and apparatus for accurately and continuously determining the length of an elastic cable under tension and more particular to methods and apparatus for determining instantaneous changes in depth and the true position of a tool suspended on the end of an elastic cable as the tool on the end of the cable is moved up and down.

This invention is particularly adapted for use in the logging of a borehole where measurements of the surrounding earth formations are taken at different depths throughout the borehole. The measurements taken throughout the length of the borehole are intended to provide indications of oil or gas bearing earth strata, and therefore, the depth of the logging or measuring tool below the surface of the earth must be accurately determined at all times so that the indicated depths of the measurements taken throughout the borehole may be accurately correlated with the actual depth of the logging or measuring tool. The measurements of the earth formations surrounding the borehole are generally taken as the logging or measuring tool is moved up the borehole.

To determine the depth of the logging or measuring tool in the borehole, a means of determining the length of cable that is lowered into the borehole may be utilized, that is, the actual number of feet of cable lowered into the borehole by a cable reeling device at the surface of the earth is counted. Many systems have been proposed to measure this cable length. Some of these are sheave devices located at the surface of the earth which provide a measurement of the length of cable which passes over sheave. Other systems utilize a sensing device responsive to magnetic marks placed on the cable along the length thereof, which systems measure the length between the magnetic marks as the cable is payed out or taken in. Some systems utilize the combination of the sheave and magnetic mark devices, such as correcting the cable length indications provided by the sheave device, with indications derived from the magnetic mark device. Another manner of determining depth is to utilize a tension measuring device at the surface of the earth, as shown in U.S. Patent No. 3,027,649, granted to Raymond W. Sloan on Apr. 3, 1962.

All of the above-named depth measuring systems are located at the surface of the earth and can only provide an average measure of the changes in depth of the logging tool in the borehole because of the thousands of feet of cable between the logging tool and the surface of the earth. The reason for this is that the force applied at the logging tool in the borehole would appear indeterminate at the surface of the earth through the cable because of the great length of cable, and the measured force appearing at the surface of the earth would be vastly delayed and distorted because of damping by the cable. These changes in force occurring at the logging tool in the borehole may be delayed by as much as several seconds from reaching the surface of the earth due to this travel time in the cable.

Thus, for example, if the tool becomes stuck on an obstruction in the borehole, a surface located depth measuring system would continue to indicate changes in the depth of the tool until the original force travels through the cable to the surface of the earth. Even then, the original force will be distorted due to damping in the cable. Likewise, when the logging tool breaks free from the obstruction, a sudden acceleration upward will take place which again will not show up at the surface of the earth for some length of time. The same principle applies to the resulting oscillations of the logging tool. Thus, it can be seen that any depth measuring system located solely at the surface of the earth will not provide instanteneous corrections for the changes in depth of a logging tool within the borehole.

When the earth strata surrounding the borehole are investigated, the location of quantity of oil sometimes cannot be determined by any one investigating method. In such cases, several different investigating methods have to be utilized and the data obtained therefrom combined and analyzed before an oil-bearing strata can be located. The apparatus for carrying out the different investigating methods cannot all be lowered into the borehole at the same time under existing investigating procedures. Thus, the various logging tools must sometimes be lowered into the borehole at different times.

To combine all of the various logging readings by the different investigating apparatus in such a manner as to determine the exact location of oil-bearing strata, the depth indications of each logging run must correlated very accurately with one another or else the combination, analysis, and computation of the different measurements taken with the different measuring or logging tools will not provide the desired results. To combine these various logging runs in such a way that the computations taken therefrom will provide the desired information, the depth indications from the various logging runs may, not uncommonly, have to be accurate to within inches of one another. Since any instantaneous changes of depth by the logging tool within the borehole could not be accurately determined by any surface located depth measuring device alone, the analysis of several different logging runs could lead to inaccurate conclusions when only such surface located devices are utilized.

One present day example of making multiple logging runs in the same borehole concerns the automatic computation of the apparent resistivity $R_{wa}$ of the natural occurring water within the porous formations surrounding the borehole. To obtain $R_{wa}$, a previously recorded induction log is played back in depth synchronism with a sonic log being presently run. The sonic and induction log data are continuously fed to an automatic computer to calculate the value of $R_{wa}$ and this computed $R_{wa}$ is simultaneously recorded with the sonic log. It can be seen that the depth of sonic and induction logs must be accurate with respect to one another to obtain an accurate calculation of $R_{wa}$.

It is also desirable to have an accurate indication of the velocity of the measuring or logging device moving through the borehole. For example, when a dipmeter tool is run through the borehole to determine the depth of the adjacent earth strata, that is, the angle that the bedding plane of the earth strata differs from the horizontal, the distance M between signal indications on different circumferential points around the borehole is obtained by moving the dipmeter across a boundary between different earth strata having different resistivity characteristics. This distance M is determined by the formula $$M = M_r \cdot \frac{V_d}{V_r}$$

where M is the actual distance between the signal indications, $M_r$ is the indicated distance between the signal indications on the recorder, $V_r$ is the velocity of the recorder, and $V_d$ is the average velocity of the dipmeter device over the interval between the indications. It can be seen that if the actual velocity of the dipmeter is different from the recorder velocity, the error in computing M will be given by the formula $$\frac{M - M_r}{M_r} = \frac{V_d - V_r}{V_r}$$

Thus when the actual velocity of the dipmeter tool is different from the recorder velocity, an error in the measured dip of the borehole will occur. If however, the instantaneous depth error is corrected, the velocity depth error will also be corrected. A correction of average depth error on the other hand would not provide a correction of velocity error.

It is an object of the invention, therefore, to provide new and improved methods and apparatus for determining the true depth of a tool within a borehole.

It is another object of the invention to provide new and improved methods and apparatus for determining the instantaneous changes in depth of a tool in a borehole.

In accordance with one feature of the invention, a method of determining depth in a borehole comprises generating a first function representative of the amount of movement of the cable as it is payed out or taken in at the surface of the earth. The method further comprises generating a second function representative of the acceleration at the tool and correcting the first function in response to the second function to provide cable length indications which more accurately approximate the instantaneous cable length changes.

In accordance with another feature of the invention, apparatus for determining depth in boreholes comprises means for providing a first function representative of the amount of movement of the cable as it is payed out or taken in at the surface of the earth. The apparatus further comprises means for determining the acceleration at the tool and means responsive to the acceleration at the tool for correcting the first function to provide cable length indications which more accurately approximate the instantaneous cable length changes.

For a better understanding of the present invention, together with other and further objects thereof, reference is had to the following description taken in connection with the accompanying drawings, the scope of the invention being pointed out in the appended claims.

Referring to the drawings.

Figure 1:
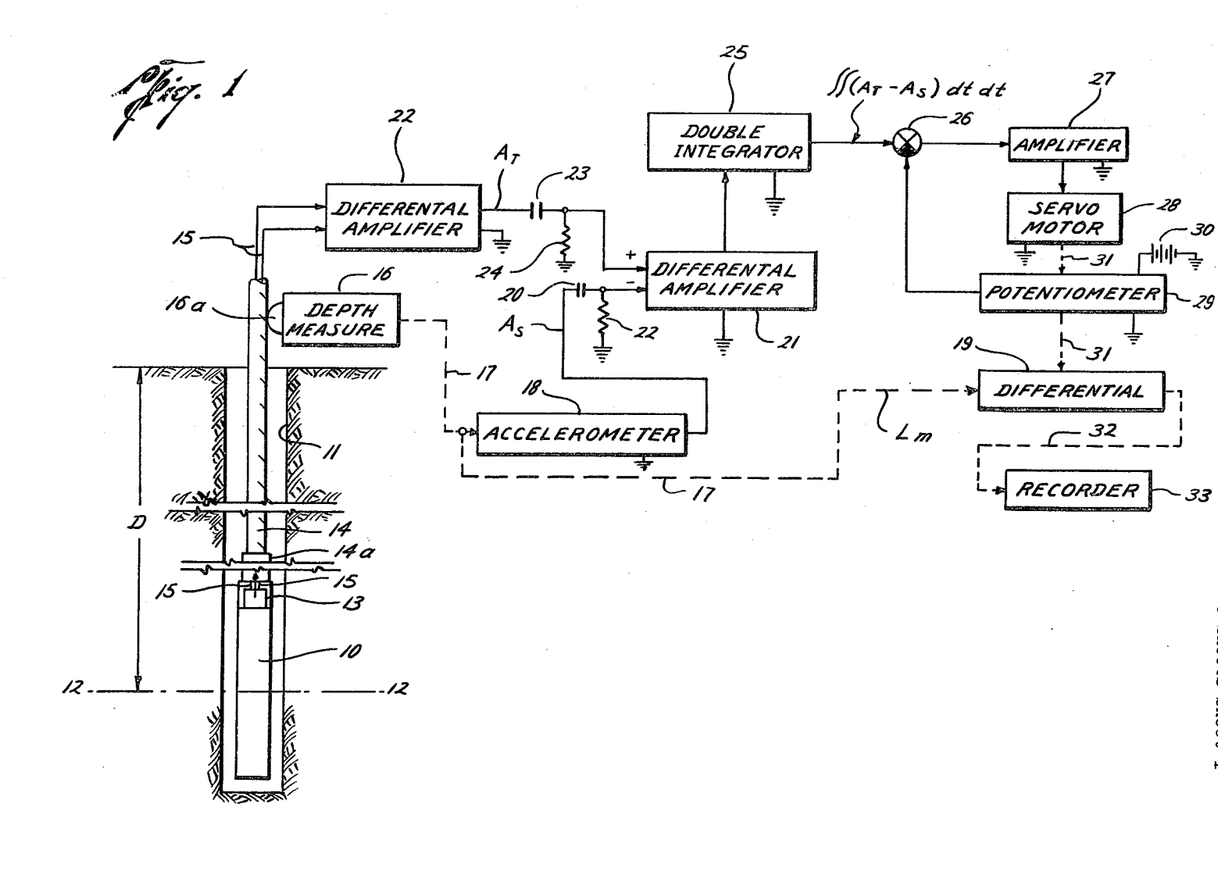
FIG. 1 illustrates a tool in a borehole together with a schematic diagram of apparatus for providing accurate indications of the depth of the tool in the borehole.

Referring to FIG. 1 of the drawings, there is shown a representative embodiment of apparatus constructed in accordance with the present invention for providing indications of the instantaneous changes in depth or cable length of a tool 10 lowered into a borehole 11 by a cable reeling device (not shown) for investigation of the earth formations surrounding borehole 11. The tool 10 can be any type of borehole tool, such as for example an electrical logging tool utilized for obtaining resistivity or conductivity measurements of the surrounding earth formations.

Typically, an investigating tool will have a center point 12 on its longitudinal axis, which center point 12 is the depth reference point for the investigating tool. The portion of the surrounding earth formations that is investigated at any one time is that portion which is adjacent to the center point 12. Thus, only a small vertical portion of the surrounding earth formations is investigated at any one instant of time. It can be seen that the depth of center point 12 must be accurately known at all times so that the depth readings of subsequent trips into the borehole will coincide.

An accelerometer 13, which measures accelerations in the direction along the longitudinal axis of tool 10, is mounted in the upper portion of tool 10. The tool 10 is supported in the borehole by an armored multiconductor cable 14 which extends to the surface of the earth, the lower 100 feet or so (14a) of armored multiconductor cable 14 being covered with an electrical insulation material such as rubber. A conductor pair 15 supplies the signal derived from accelerometer 13 to the surface of the earth via the armored multiconductor cable 14.

A depth measuring device 16 having an accurate measuring wheel 16a which is mechanically coupled to the armored multiconductor cable 14 so as to rotate with movement of cable 14, causes a rotational output on shaft 17 proportional to the length of cable which passes rotating wheel 16a. The depth measuring device 16 can comprise any known device for measuring the amount of cable which passes by, such as a sheave measuring wheel or a sheave wheel corrected by a magnetic mark detection system, both of which are well known in the art. The rotating shaft 17 drives an accelerometer 18 and a differential gear 19.

The output voltage from accelerometer 18, which voltage is proportional to the acceleration of shaft 17, is supplied to a capacitor 20, the other side of capacitor 20 being connected to the negative input of a differential amplifier 21 and through a resistor 22 to ground. The conductor pair 15, which supplies the voltage output from accelerometer 13 in the tool 10, which voltage is proportional to the acceleration of the tool 10 along the longitudinal axis of the tool 10, is supplied to the input of a differential amplifier 15. The output of differential amplifier 22 is connected between ground and one side of a capacitor 23, the other side of capacitor 23 being connected to the positive input of differential amplifier 21 and through a resistor 24 to ground. The output from differential amplifier 21 is connected to the input of a double integrator circuit 25, of standard design. The output from double integrator 25 is connected to a junction point 26. The output from junction point 26 is connected to the input of an amplifier 27, the output of which is supplied to a servomotor 28. The mechanical output from servomotor 28 drives the wiper arm of a potentiometer 29. A constant DC voltage from battery 30 is supplied across the resistance portion of potentiometer 29. The electrical output from potentiometer 29 derived on the wiper arm thereof is supplied to the negative input terminal of junction point 26. (This can be accomplished, for example, by making the potential on the wiper arm of potentiometer 29 negative.) The output shaft 31 from servomotor 28 also is mechanically coupled to the differential gear 19. The differential gear 19 supplies a mechanical rotational output on a shaft 32 to a recorder 33.

Now, concerning the operation of the FIG. 1 apparatus, the equation for the cable length or depth $L_{avg}$ of the tool 10 within the borehole 11 without correction by the accelerometer system can be written as:

$$L_{avg} = D - L_m \qquad (1)$$

where D is the initial cable length or depth of the tool 10 at the bottom of the borehole prior to reeling in the cable 14 under steady state conditions, and $L_m$ is the average changes in cable length of the cable 14 passing the depth measuring device 16. The initial cable length or depth D can be accurately determined from the depth measuring device 16 when the cable 14 and tool 10 are under static conditions. Additionally, the tension on the cable at the surface of the earth along with corrections derived from the temperature measurements can be utilized to determine accurately the initial cable length or depth D. The depth reading of recorder 33 is then initially set at this initial cable length or depth value D. Then, as the cable 14 is reeled in, the average changes in cable length $L_m$ is substrated from the initial depth D set into recorder 33 via shaft 17. Thus, if the rotatable shaft 17 were supplied directly to recorder 33, the cable length or the depth of tool 10 would be represented according to Equation 1.

However, as stated previously, there are forces acting on cable 14 and the tool 10 which cause the instantaneous cable length or depth of tool 10 to be different from the cable length indicated by Equation 1. A device located at the surface of the earth for correcting Equation 1, such as a surface tension measuring system, could not accurately determine the instantaneous changes of cable length at the tool 10 since the mechanical disturbance at the tool or at some point along the cable, would be delayed from reaching the surface of the earth and distorted because of this great length of cable. Thus, for example, if the tool 10 became suddenly stuck in the borehole, the force reflected by this occurrence would not reach the surface of the earth in the form of a change in tension for some time period after the tool 10 became stuck, during which time the recorder 33 would continue to indicate changes in the cable length. It would also be difficult to replay the recorder 33 after the logging run and correct for these instantaneous changes in depth based on a mathematical computation of the delay time between the tool 10 and the surface of the earth, since it is not known whether the disturbance occurs at the tool 10 or at some other point along the cable 14.

To solve this problem, the acceleration is measured at the tool by accelerometer 13 and electrically transmitted via conductor pair 15 to the surface of the earth, thus erasing the error from the time delay. The changes in cable length could theoretically be obtained by taking the total double integration of this measured acceleration at the tool 10. However, the accuracy of the accelerometer and integrating circuits would have to be extremely high in this case. To get around these accuracy requirements, the acceleration signal derived from accelerometer 13 at the tool is used to correct the average cable length change indications derived from depth measuring device 16. Thus, the only integration made concerns the variations from these average indications. However, to accomplish this, the acceleration of the cable at the surface of the earth must be known.

Since it is difficult, if not impossible, to maintain a constant velocity of the cable 14 at the surface of the earth, the accelerometer 18 is connected to the rotating shaft 17 to measure the acceleration thereof. This indication of acceleration measured by accelerometer 18 at the surface, designated $A_s$, is subtracted from the indication of acceleration at the tool measured by accelerometer 13, designated $A_t$, by differential amplifier 21. The resulting acceleration signal is integrated twice by double integrator 25 to provide an output voltage proportional to the difference in displacement variations between the top and bottom of the cable.

This output voltage from double integrator 25, which is equal to $\iint (A_t - A_s) dt dt$ causes shaft 31 to rotate an amount proportional to $\iint (A_t - A_s) dt dt$ through the null balance servo system comprising junction point 26, amplifier 27, servomotor 28, and potentiometer 29. The servomotor 28 causes the output shaft 31 to rotate until such time as the magnitude of the voltage output from potentiometer 29 is equal to the magnitude of the voltage output from double integrator 25. Thus, the rotational output on shaft 31, which is proportional to $\iint (A_t - A_s) dt dt$, corrects the cable length indications $L_m$ on shaft 17 in differential gear 19. The equation for the output shaft 32 of differential gear 19 can be written as $$L_m + \iint (A_t - A_s) dt dt$$

Therefore, the equation for the instantaneous cable length or depth $L_I$ indicated by recorder 33 in the FIG. 1 embodiment can be written as:

$$L_I = D - L_m + \iint (A_t - A_s) dt dt \qquad (2)$$

However, there are factors which may cause errors in the output signal from the accelerometer 13 located within the tool 10. One of these factors is the temperature changes encountered within the borehole, which may cause the output voltage from accelerometer 13 to drift from the zero level. Another possible error may arise when the borehole 11 is slanted at an angle from the vertical, the vertical being considered as the axis of gravity. When this occurs, the accelerometer 13 within the tool 10 will provide a constant error output voltage under steady state conditions due to the fact that the output voltage from accelerometer 13 has been set at zero volts when the tool 10 is centered on the gravitational axis under steady state conditions. To solve both of these problems, an RC network comprising capacitor 23 and resistor 24 has been provided on the output of differential amplifier 22. This RC network 23–24 will block error voltages due to temperature or slanted boreholes (or any other cause), and will look for changes in the applied input voltage. These changes in voltage reflect the changes in acceleration at the tool.

The time constant of this RC network should be such as to block the slow variations in voltage due to drift in the zero reference level of accelerometer 13, but such as to pass the wide range of acceleration frequencies which might be encountered. Since, during the time of mechanical transmission of the disturbance through the cable 14 from the tool 10 to the surface of the earth, accelerometer 13 is the only instrument accurately measuring the forces at the tool 10, an acceleration force lasting the duration of this transmission time should be accurately passed. If the RC time constant is three times the maximum encountered mechanical transmission time, sufficient accuracy should be obtained. The maximum transmission time has been found to usually be approximately two seconds under normal borehole conditions. Thus, the RC time constant should be approximately six seconds.

If the zero reference drifts are found to be sufficiently slow, a larger time constant could be used so as to pass slower accelerations, or if the maximum mechanical acceleration time was less, a smaller time constant could be used. At any rate, the particular time constant used is a compromise between the two conflicting considerations. The RC network comprising capacitor 20 and resistor 22 on the output of accelerometer 18 should desirably have the same time constant as the RC network comprising capacitor 23 and resistor 24 to balance the system.

Now, taking an example of the operation of the present system, if the tool 10 should suddenly become stuck in the borehole while the cable 14 is being reeled in, that portion of the cable 14 at the surface of the earth will continue to move for some time period after the disturbance occurs at the tool due to the travel time through the cable. Thus, shaft 17 will continue to rotate at a constant velocity which, if not corrected, would cause the depth drive of recorder 33 to continue moving while the tool 10 is stationary.

However, this sudden deceleration of the tool will cause accelerometer 13 to supply an output voltage proportional to the deceleration of the tool to differential amplifier 22, which refers this voltage to the common ground reference. Since the time constant of the RC network 23–24 is substantially greater than the time duration of the input voltage, RC network 23–24 will pass the acceleration signal $A_t$ to differential amplifier 21. Since the acceleration of the tool is in the negative direction (deceleration), a negative voltage will be supplied to differential amplifier 21 (if this sign convention is adopted). After double integration by double integrator 25, a negative voltage proportional to displacement is supplied to the servo system comprising junction point 26, amplifier 27, servomotor 28, and potentiometer 29, thus causing the output shaft 31 from servomotor 28 to rotate an amount proportional to this displacement voltage. The output shaft 31 will be rotating at an equal rate but opposite direction from the rotating shaft 17 from depth measuring device 16. This causes the output shaft 32 from differential gear 19 to remain stationary, which corresponds to the actual displacement of tool 10 within the borehole.

At some later time, the deceleration force will arrive at the surface of the earth causing that portion of the cable 14 at the surface of the earth to stop moving, thus causing rotating shaft 17 to remain stationary. However, when rotating shaft 17 decelerates to a stationary position, accelerometer 18 generates a negative voltage proportional to this deceleration, which voltage is applied by way of the negative input terminal of the differential amplifier 21 to double integrator 25 as a positive voltage. This positive voltage from differential amplifier 21 begins reducing the negative voltage being supplied to junction point 26 until the output voltage from double integrator 25 is constant, thus causing output shaft 31 to stop rotating. Thus, at this time, neither shaft 17, 31, and therefore 32, are rotating, thus corresponding to the still stationary position of tool 10 within the borehole. The rate at which shaft 31 slows down is substantially equal to the rate at which shaft 17 will slow down in this case, thus causing shaft 32 to remain stationary during this entire process.

Now, when the tool 10 breaks free from the obstruction and begins accelerating upward, the same process will take place with the exception that the voltages from the accelerometers 13 and 18 will be reversed in polarity. Thus, the upward acceleration of tool 10 will cause a positive voltage from accelerometer 13, causing shaft 31 to rotate in a manner proportional to the movement of the tool 10. Since shaft 17 is still stationary, shaft 32 will rotate as shaft 31 rotates. When this acceleration force reaches the surface of the earth through the cable 14, shaft 17 begins to rotate in a positive direction, but at the same time, the accelerometer 18 will generate a voltage proportional to this acceleration of the cable at the surface which begins bringing the positive output voltage from double integrator 25 toward a constant voltage (i.e., leveling off the output voltage from integrator 25 to a given value), thus stopping the rotation of shaft 31. Thus, under steady state conditions, shaft 17 will be the sole driving force for recorder 33. The same process applies for any subsequent oscillation of the tool 10 or cable 14 which may occur.

Thus, it can be seen that the apparatus of FIG. 1 will provide substantially accurate and instantaneous indications of the instantaneous changes in depth of the tool within the borehole 11 via shaft 32, and will provide accurate and instantaneous indications of the true and instantaneous depth in recorder 33. It can be seen that by measuring the acceleration both at the bottom of the cable and at the top of the cable, the total integration of depth is not required to be made and depth measuring device 16 which measures only the average changes in cable length can be corrected by measuring the difference in acceleration between the top and bottom of the cable.

Figure 2:
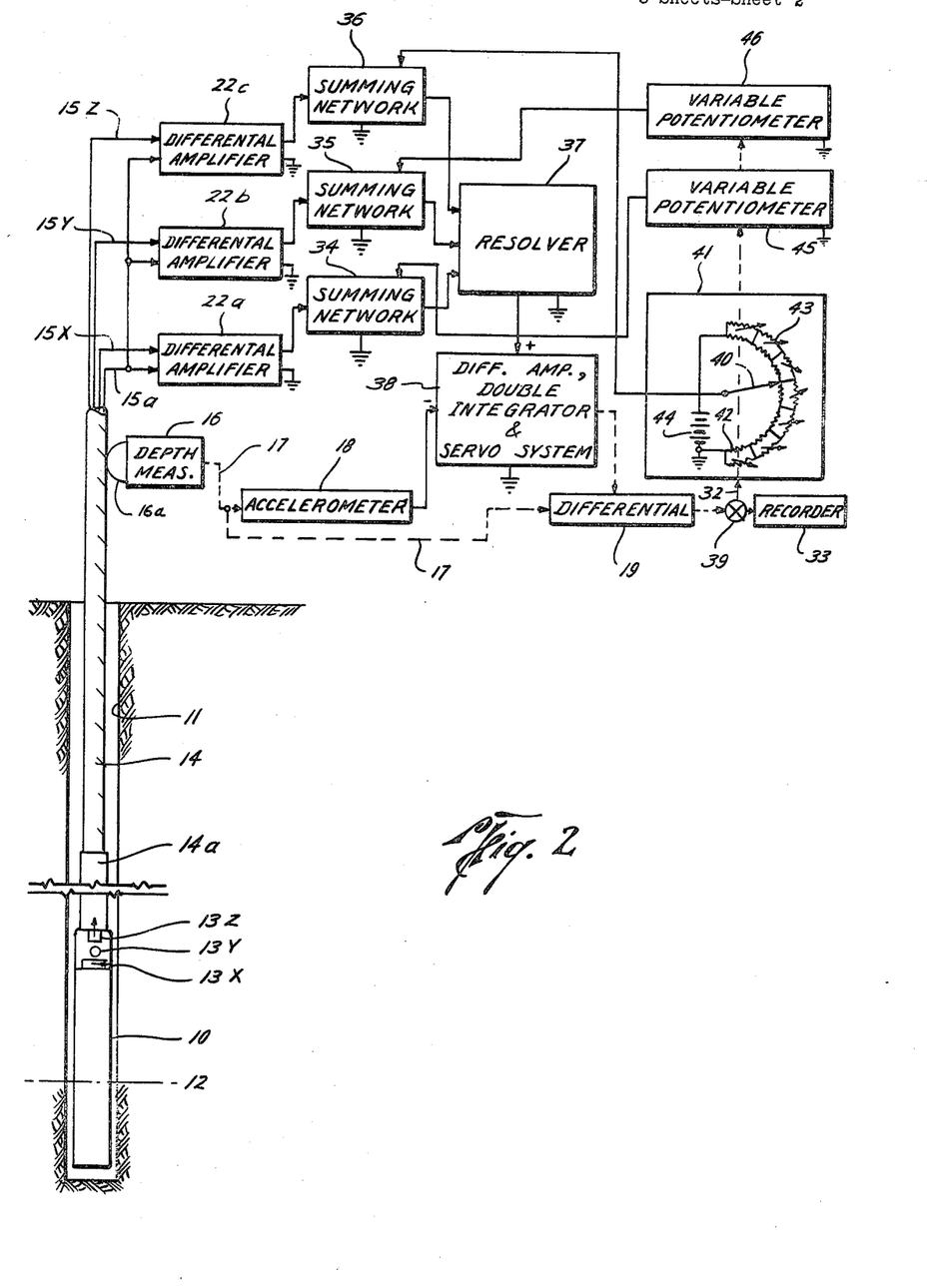
FIG. 2 illustrates a three axis accelerometer system together with a schematic diagram of the apparatus for providing accurate indications of the depth of the tool in the borehole.

Looking now at FIG. 2, there is shown a second embodiment of apparatus for determining the instantaneous changes in cable length, but without using the RC networks utilized in the FIG. 1 embodiment. Those components in the FIG. 2 embodiment which are the same as components in the FIG. 1 embodiment have the same number designations. In the FIG. 2 embodiment, the tool 10 has three accelerometers mounted therein, each of the accelerometers adapted to measure a component of acceleration in a direction 90° apart from the others. These accelerometers are designated 13x, 13y, and 13z, the x, y and z designations referring to the axis on which the acceleration is measured.

The three axis accelerometer system sends the signals proportional to the measured accelerations to the surface of the earth via conductors 15a, 15x, 15y, and 15z, which pass through armored multiconductor cable 14. Conductor 15a is the common return for all three accelerometers mounted within the tool 10 and, as such, is supplied to the inputs of differential amplifiers 22a, 22b, and 22c. Conductor 15x from accelerometer 13x is supplied to the other input of differential amplifier 22a; conductor 15y from accelerometer 13y is connected to the other input of differential amplifier 22b; and conductor 15z from accelerometer 13z is connected to the other input of differential amplifier 22c. Differential amplifiers 22a, 22b, and 22c serve the same purpose as differential amplifier 22 in FIG. 1.

The output of differential amplifier 22a is supplied between ground and one input of a summing network 34; the output of differential amplifier 22b is supplied between ground and one input of a summing network 35; and the output from differential amplifier 22c is connected between ground and one input of a summing network 36. Summing networks 34, 35, and 36 add the applied inputs in a linear fashion while isolating the input circuits from one another. The outputs from summing networks 34, 35, and 36 are supplied to the input of a resolver 37, of standard design for resolving a three axis system. The output from resolver 37 is supplied to the positive input of a differential amplifier, double integrator and servo system 38 which is the same as differential amplifier 21, double integrator 25 and the servo system comprising junction point 26, amplifier 27, servomotor 28 and potentiometer 29 in FIG. 1. However, in the FIG. 2 apparatus, there are no RC networks on the inputs to the differential amplifier 38.

The connections and functions of depth measuring device 16, accelerometer 18, differential gear 19 and recorder 33 are the same as the identically numbered components in the FIG. 1 apparatus. However, in the FIG. 2 apparatus, the output shaft 32 from differential gear 19 is also supplied through a junction point 39 to drive the wiper arm 40 of a potentiometer 41. The resistance portion 42 of potentiometer 41 has a plurality of variable resistors 43 connected across different portions thereof. A battery 44 having the negative terminal grounded (or positive terminal depending on the polarity of the drift) is connected across the resistance portion 42 of potentiometer 41. The voltage derived on wiper arm 40 is supplied to the other input of summing network 36. Shaft 32 also drives the wiper arm of identically constructed potentiometers 45 and 46, the voltage derived on the wiper arm of potentiometer 45 being supplied to the other input of summing network 34, and the voltage derived on the wiper arm of potentiometer 46 being supplied to the other input of summing network 35.

In the FIG. 1 apparatus, the RC network 23–24 substantially reduced errors in the system due to the instability of the downhole accelerometer, since this instability would cause the generation of a slowly varying voltage. However, the time constant of the RC network must satisfy two conflicting conditions, as stated earlier, which results in providing a time constant which is a compromise between the two. Thus, a slight error may result when relatively slow accelerations are encountered. The RC networks shown in FIG. 1 have been omitted from the FIG. 2 apparatus. Thus, the apparatus of FIG. 2 is responsive to any acceleration which may be encountered. However, there still remains the problem of drift in the accelerometer reference level due to temperature, and slanted boreholes.

Figure 3:
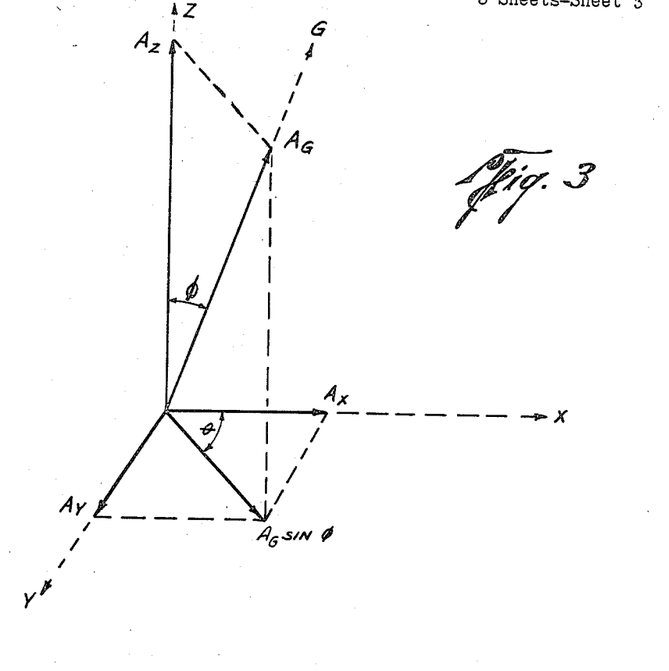
FIG. 3 illustrates a vector diagram of the acceleration forces experienced by a three axis accelerometer system.

Looking now at FIG. 3, there is shown a vector diagram of the accelerations measured by the three axis accelerometer system of FIG. 2. The $x$, $y$ and $z$ axes of FIG. 3 correspond to the $x$, $y$ and $z$ axes of accelerometers $13x$, $13y$, and $13z$ of FIG. 2. The G axis corresponds to the axis of gravity. The vector $\overline{A}_G$ in FIG. 3 represents the acceleration force on the gravity axis. The component of $\overline{A}_G$ on the $z$ axis is equal to:

$$\overline{A}_z = \overline{A}_G \cos \phi \qquad (3)$$

where $\overline{A}_z$ is the acceleration along the $z$ axis and $\phi$ is the angle between the G and $z$ axes.

The component of $\overline{A}_G$ on the $xy$ plane is equal to $\overline{A}_G \sin \phi$. Thus, the component of acceleration along the $x$ axis, designated $\overline{A}_x$, can be written as:

$$\overline{A}_x = \overline{A}_G \sin \phi \cos \theta \qquad (4)$$

where $\theta$ is the angle between $\overline{A}_G \sin \phi$ and the $x$ axis. Likewise, the component of acceleration along the $y$ axis, designated $\overline{A}_y$, is equal to:

$$\overline{A}_y = \overline{A}_G \sin \phi \sin \theta \qquad (5)$$

Accelerometers $13x$, $13y$ and $13z$ of FIG. 2 measure the accelerations $\overline{A}_x$, $\overline{A}_y$ and $\overline{A}_z$ and thus resolver 37 solves Equations 3, 4 and 5 to arrive at the component of the acceleration along the G axis, which is the desired component.

Additionally, the equation for the vector $\overline{A}_G$ can be written as:

$$\overline{A}_G^2 = \overline{A}_x^2 + \overline{A}_y^2 + \overline{A}_z^2 \qquad (6)$$

Thus, a standard computer for solving Equation 6 could be substituted in place of resolver 37 to arrive at the same result.

As stated earlier, the accelerometer output voltage is set to zero volts under steady state conditions, thus eliminating the affects of gravity. However, when the tool 10 and thus the accelerometer 13 are tilted in the borehole, which is the situation shown in FIG. 3, a one-axis accelerometer would generate a voltage which would be in error. Considering the $z$ axis as the axis of a one-axis accelerometer, the force due to gravity, designated $\overline{G}$, can be substituted into Equation 3 for $\overline{A}_G$. Thus, Equation 3 would take the form $\overline{A}_z = \overline{G} \cos \phi$. $\overline{G}(1 - \cos \phi)$ would then be the error voltage generated by a one-axis accelerometer system. Since this error signal is a steady state signal (assuming $\phi$ to be constant), the RC network 23–24 of FIG. 1 will erase this error signal due to slanted boreholes.

In the case of a slanted borehole, the displacement along the axis of the borehole is the desired component of displacement. Since the angle of slant for most boreholes is relatively slight and the system of FIG. 2 is only measuring changes in displacement from that measured by depth measuring device 16, the AC type error resulting from borehole slant is usually not too great. AC type error signifies the error caused by an actual acceleration at the tool being measured along the gravitational axis rather than the borehole axis. That is to say, for example, if an acceleration force $\overline{F}$ is applied along the tool axis $z$, the resolved acceleration signal $\overline{A}_G$ will be equal to $\overline{A}_z/\cos \phi$. Since the desired axis of displacement, and thus acceleration, is along the axis of the borehole, which is presumably the $z$ axis (if the tool is aligned with the borehole), the resolved acceleration signal will be in error by a factor of $(1 - \cos \phi)$. But, as stated, since the slant angle of most boreholes is slight and the acceleration signal is used only for changes in displacement instead of the total displacement, the resulting AC type error will be relatively negligible.

On the other hand, the DC type error due to the zero reference level being non-zero because of a slanted borehole would be substantially minimized with the FIG. 2 system. This is because the system of FIG. 2 measures acceleration along the G axis (the output of resolver 37) and thus the steady state error signal $\overline{G}(1 - \cos \phi)$ is not present.

To solve the problem of zero reference drift due to temperature, variable potentiometers 41, 45 and 46 are adapted to supply to summing networks 34, 35 and 36 signals proportional to this zero reference drift due to temperature, which signals are subtracted from the respective acceleration signals. The magnitude of the zero reference drift due to temperature can be determined by empirical methods. Since the temperature at the bottom of the borehole is usually measured and charts of temperature variations with depth in the borehole are readily available, the variation of zero reference voltage with depth of any given borehole can be determined. The variable resistors 43 can then be adjusted in such a manner that the voltage on wiper arm 40 will be proportional to this zero reference drift. Thus, it can be seen that as the wiper arm 40 varies with depth, the output of summing network 36 will always provide zero voltage under no acceleration conditions. The same principle applies to the other acceleration axes.

It can now be seen that the apparatus of FIG. 2 will accurately measure slow accelerations since RC network 23–24 is not present in this system, while at the same time, substantially minimizing DC type errors caused by slanted boreholes and temperature. This is achieved at the expense of a small AC type error due to using the resolved acceleration $\overline{A}_G$ rather than the borehole axis acceleration $\overline{A}_z$.

Figure 4:
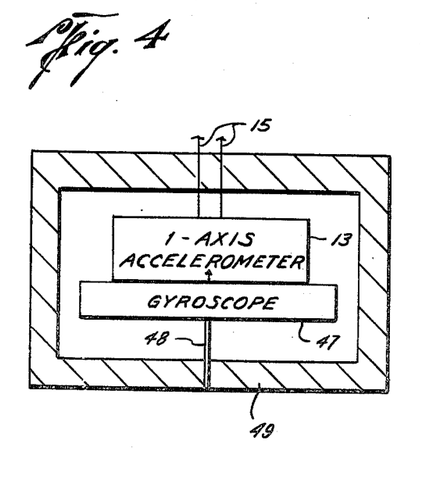
FIGS. 4 and 5 illustrate other embodiments of mounting an accelerometer within a tool in a borehole.
Figure 5:
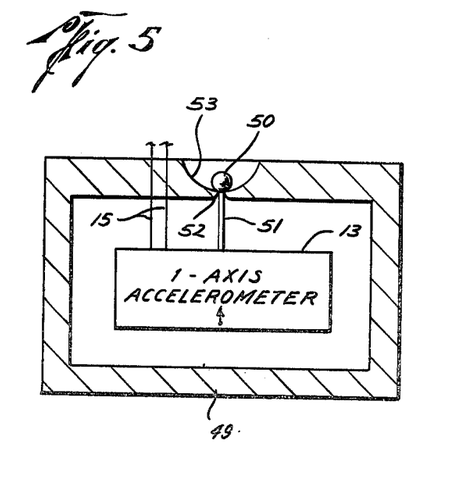

Looking now at FIGS. 4 and 5, there are shown separate embodiments of the present invention utilizing a one-axis accelerometer for always providing the component of acceleration at the tool along the G axis. In FIG. 4, the one-axis accelerometer 13 is mounted on a gyroscope device 47 of standard design, which gyroscope device 47 is supported by a shaft 48 secured to a base 49 which is fixed relative to the tool 10. The gyroscope device 47 is adapted to maintain a fixed position with respect to gravity in the usual manner.

In FIG. 5, the one-axis accelerometer 13 is maintained on the $\overline{G}$ axis by utilizing a pendant system. The accelerometer 13 is supported by a shaft 51 which is secured to a ball bearing 50. A half spherically shaped support member 53 having a circular opening 52 in the bottom portion thereof is fixed to the tool 10. The shaft 51 passes through the opening 52 to the ball bearing 50 which rests on the bottom portion of support member 53 over the opening 52. The weight of accelerometer 13 causes ball bearing 50 to always be in a fixed position to the gravity axis. The pendant system shown in FIG. 5 is only an example of the many types of pendant systems which could be used with the present invention.

The FIGS. 4 and 5 accelerometer apparatus would be utilized with the system of FIG. 2. The output signal from accelerometer 13 of FIGS. 4 or 5 would be supplied via conductors 15 to one differential amplifier 22, whose output would be supplied to one summing network 36. Only one variable potentiometer 41 would be necessary. Resolver 37 would not be necessary in this case since only one accelerometer is used. Of course, no RC networks, such as 23–24 and 20–22 of FIG. 1, would be necessary since the signal from accelerometer 13 is always the component of acceleration on the $\overline{G}$ axis and potentiometer 41 solves the temperature problem.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of determining the instantaneous changes in position in a borehole of a tool supported therein by a cable subject to change in length, comprising:
   (a) generating a first signal representative of the amount of movement of the cable as it is payed out or taken in at the surface of the earth;
   (b) generating a second signal representative of the acceleration of the tool; and
   (c) correcting the first signal in response to the second signal to provide cable length indications which more accurately approximate the instantaneous cable length changes.

2. The method of claim 1 and further including: filtering out that portion of the second signal which varies in a relatively slow manner.

3. A method of determining the instantaneous changes in position in a borehole of a tool supported therein by a cable subject to change in length, comprising:
   (a) generating a first signal representative of the amount of movement of the cable as it is payed out or taken in at the surface of the earth;
   (b) generating a second signal representative of the acceleration of the tool;
   (c) generating a third signal representative of the acceleration of the cable at the surface of the earth; and
   (d) correcting the first signal in response to the difference in acceleration between the second and third signals to provide cable length indications which more accurately approximate the instantaneous cable length changes.

4. A method of determining the instantaneous changes in position in a borehole of a tool supported therein by a cable subject to change in length, comprising:
   (a) generating a first signal representative of the amount of movement of the cable as it is payed out or taken in at the surface of the earth;
   (b) generating a second signal representative of the acceleration of the tool along a first axis;
   (c) generating a third signal representative of the acceleration of the tool along a second axis spaced 90 degrees from the first axis;
   (d) generating a fourth signal representative of the acceleration of the tool along a third axis spaced 90 degrees from the first and second axes;
   (e) generating a fifth signal in response to the second, third, and fourth signals representative of the acceleration along the gravitational axis; and
   (f) correcting the first signal in response to the fifth signal to provide cable length indications which more accurately approximate the instantaneous cable length changes.

5. The method of claim 1 and further including:
   (1) generating a temperature correction signal in response to the changes in cable length; and
   (2) correcting the second signal in response to the temperature correction function.

6. The method of claim 4 and further including:
   (1) generating a plurality of temperature correction signals in response to the changes in cable length; and
   (2) correcting each of the second, third, and fourth signals in response to the plurality of temperature correction signals.

7. A method of determining the position in a borehole of a tool supported therein by a cable subject to change in length, comprising:
   (a) adjusting a recording device to indicate the depth D of the tool at the bottom of the borehole under static conditions;
   (b) generating a first signal representative of the amount of movement of the cable as it is payed out or taken in at the surface of the earth;
   (c) generating a second signal representative of the difference between the acceleration of the tool and the acceleration of the cable at the surface of the earth;
   (d) correcting the first signal in response to the second signal to provide cable length indications which more accurately approximate the instantaneous cable length changes; and
   (e) combining the corrected cable length indications with depth D of the tool at the bottom of the borehole for providing an indication of the instantaneous depth of the tool in the borehole.

8. A system for determining the instantaneous changes in position in a borehole of a tool supported therein by a cable subject to change in length, comprising:
   (a) means for providing a first signal representative of the amount of movement of the cable as it is payed out or taken in at the surface of the earth;
   (b) means for determining the acceleration of the tool; and
   (c) means responsive to the acceleration of the tool for correcting the first signal to provide cable length indications which more accurately approximate the instantaneous cable length changes.

9. A system for determining the instantaneous changes in position in a borehole of a tool supported therein by a cable subject to change in length, comprising:
   (a) means for providing a first signal representative of the amount of movement of the cable as it is payed out or taken in at the surface of the earth;
   (b) means for determining the difference between the acceleration of the tool and the acceleration of the cable at the surface of the earth; and
   (c) means responsive to the difference in acceleration for correcting the first signal to provide cable length indications which more accurately approximate the instantaneous cable length changes.

10. A system for determining the instantaneous changes in position in a borehole of a tool supported therein by a cable subject to change in length, comprising:
    (a) means for providing a first signal representative of the amount of movement of the cable as it is payed out or taken in at the surface of the earth;
    (b) means for providing a second signal representative of the acceleration of the tool;
    (c) means for providing a third signal representative of the acceleration of the cable at the surface of the earth;
    (d) means for measuring the difference between the first and second signals to produce a difference signal; and
    (e) means responsive to the difference signal for correcting the first signal to provide cable length indications which more accurately approximate the instantaneous cable length changes.

11. The system of claim 10 wherein the means for providing the second and third signals both include a high-pass filter for filtering out slow variations of the acceleration signals.

12. A system for determining the instantaneous changes in position in a borehole of a tool supported therein by a cable subject to change in length, comprising:
    (a) means for providing a first signal representative of the amount of movement of the cable as it is payed out or taken in at the surface of the earth;

(b) means for providing a second signal representative of the acceleration of the tool;

(c) means for providing a third signal representative of the acceleration of the cable at the surface of the earth;

(d) means for measuring the difference between the second and third signals to produce a difference signal;

(e) means responsive to the difference signal for generating a fourth signal representative of an error in the first signal which error is related to the second and third signals; and (f) means for combining the fourth signal with the first signal to produce a fifth signal representative of the instantaneous cable length changes.

13. A system for determining the instantaneous changes in position in a borehole of a tool supported therein by a cable subject to change in length, comprising:

(a) means for providing a first signal representative of the amount of movement of the cable as it is payed out or taken in at the surface of the earth;

(b) means for providing a second signal representative of the acceleration of the tool;

(c) means for providing a third signal representative of the acceleration of the cable at the surface of the earth;

(d) means responsive to the second and third signals for providing a fourth signal representative of the difference between the second and third signals;

(e) means responsive to the fourth signal for providing a fifth signal representative of the double integral of the fourth signal; and (f) means for combining the fifth signal with the first signal to produce a sixth signal representative of the instantaneous cable length changes.

14. A system for determining the position in a borehole of a tool supported therein by a cable subject to change in length wherein the true depth D under static conditions at an initial point in the borehole is first determined and an indication thereof set into a cable length indicating device, comprising:

(a) first means for providing a first signal indicative of the amount of movement of the cable as it is payed out or taken in at the surface of the earth;

(b) second means for determining the difference between the acceleration of the tool and the acceleration of the cable at the surface of the earth;

(c) third means responsive to the difference in acceleration for correcting the first signal to provide a corrected cable length signal which more accurately approximates the instantaneous cable length changes; and (d) fourth means for applying the corrected cable length change signal to the cable length indicating device for combination with the indication of depth D of the tool at the initial point in the borehole in the cable length indication device for providing an indication of the instantaneous depth of the tool in the borehole.

15. A system for determining the instantaneous changes in position in a borehole of a tool supported therein by a cable subject to change in length, comprising:

(a) first means for providing a first signal representative of the amount of movement of the cable as it is payed out or taken in at the surface of the earth;

(b) second means, including three axis accelerometer means in the tool, for providing a second signal representative of the component of acceleration of the tool along the gravitational axis;

(c) third means for providing a third signal representative of the acceleration of the cable at the surface of the earth; and (d) fourth means responsive to the difference between the second and third signals for correcting the first signal to provide cable length indications which more accurately approximate the instantaneous cable length changes.

16. The system of claim 15 wherein the second means includes:

(1) three accelerometers in the tool, each accelerometer adapted to measure the acceleration along an axis 90 degrees apart from the other accelerometers; and (2) means responsive to the measured accelerations of the tool for providing the second signal.

17. The system of claim 10 and further including:

(1) means for providing a temperature correction signal in response to the changes in cable length; and (2) means for correcting the second signal in response to the temperature correction signal.

18. The system of claim 16 and further including:

(1) means for providing a temperature correction signal in response to the changes in cable length; and (2) means for correcting the second signal in response to the temperature correction signal.

19. The system of claim 10 wherein the means for providing the second signal includes:

(1) accelerometer means; and (2) means for pendantly connecting the accelerometer means to the tool, so that the accelerometer will measure accelerations substantially on the gravitational axis.

20. The system of claim 10 wherein the means for providing the second signal includes:

(1) accelerometer means; and (2) gyroscope means having the accelerometer means attached thereto and pivotally coupled to the tool for maintaining the accelerometer means on a substantially fixed axis, so that the accelerometer means will measure accelerations substantially on the gravitational axis.

21. A method of determining the instantaneous changes in position of a tool supported in a borehole by a cable, comprising:

(a) measuring the amount of movement of the cable at the surface of the earth as the cable is payed out or taken in to produce a cable movement measurement;

(b) measuring the acceleration of the tool to produce a first acceleration measurement;

(c) measuring the acceleration of the cable at the surface of the earth to produce a second acceleration measurement;

(d) combining the first and second acceleration measurements to produce a correction signal; and (e) correcting the cable movement measurement with the correction signal to provide a corrected cable movement measurement which is more accurately representative of instantaneous changes in tool position.

22. The method of claim 21 wherein the step of combining the first and second acceleration measurements include the steps of subtracting one of the first or second acceleration measurements from the other of said acceleration measurements to produce a difference signal, and twice integrating the difference signal to produce the correction signal.

23. The method of claim 22 and further including the steps of filtering out low frequency components of both of said acceleration measurements.

24. A method of determining the instantaneous changes in position of a tool supported in a borehole by a cable, comprising:

(a) measuring the amount of movement of the cable at the surface of the earth as the cable is payed out or taken in to produce a cable movement measurement $\Delta L_m$;

(b) measuring the acceleration of the tool to produce a first acceleration measurement $A_t$;

(c) measuring the acceleration of the cable at the surface of the earth to produce a second acceleration measurement $A_s$;

(d) combining the acceleration measurements to produce a correction signal $\Delta L_A$ in accordance with the relationship:

$$\Delta L_A = \int\int (A_t - A_s) dt dt$$

where $t$ is time; and (e) combining the cable movement measurement $\Delta L_m$ with the correction signal $\Delta L_A$ to provide a corrected cable movement measurement which is more accurately representative of instantaneous changes in tool position.

25. Apparatus for determining the instantaneous changes in position of a tool supported in a borehole by a cable, comprising:

(a) means for measuring the amount of movement of the cable at the surface of the earth as the cable is payed out or taken in to produce a cable movement measurement;

(b) means for measuring the acceleration of the tool to produce a first acceleration measurement;

(c) means for measuring the acceleration of the cable at the surface of the earth to produce a second acceleration measurement;

(d) means for combining the first and second acceleration measurements to produce a correction signal; and (e) means for combining the correction signal with the cable movement measurement to provide a corrected cable movement measurement which is more accurately representative of instantaneous changes in tool position.

26. The apparatus of claim 25 wherein the means for combining the acceleration signals includes means for subtracting one of the first or second acceleration measurements from the other of said acceleration measurements to produce a difference signal, and double integrator means for twice integrating the difference signal to produce the correction signal.

27. The apparatus of claim 26 and further including means for filtering out the low frequency components of the acceleration measurements.

References Cited

UNITED STATES PATENTS 3,027,649  4/1962  R. W. Sloan.

LEONARD FORMAN, Primary Examiner

F. S. D'AMBROSIO, Assistant Examiner

U.S. Cl. X.R.

73—151; 340—18